(12) United States Patent
Jeong

(10) Patent No.: US 8,837,879 B2
(45) Date of Patent: Sep. 16, 2014

(54) OPTICAL WAVEGUIDE DEVICE AND OPTICAL HYBRID CIRCUIT

(75) Inventor: Seok-Hwan Jeong, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 119 days.

(21) Appl. No.: 13/354,718

(22) Filed: Jan. 20, 2012

(65) Prior Publication Data

US 2012/0243827 A1 Sep. 27, 2012

(30) Foreign Application Priority Data

Mar. 25, 2011 (JP) ................. 2011-067280

(51) Int. Cl.
*G02B 6/26* (2006.01)
*G02B 6/28* (2006.01)
*G02B 6/293* (2006.01)

(52) U.S. Cl.
CPC ............ *G02B 6/2813* (2013.01); *G02B 6/2935* (2013.01)
USPC .......................................................... 385/32

(58) Field of Classification Search
CPC .............................. G02B 6/2813; G02B 6/2935
USPC ..................................... 385/31, 32
See application file for complete search history.

(56) References Cited

U.S. PATENT DOCUMENTS

| | | | | |
|---|---|---|---|---|
| 5,247,594 A | * | 9/1993 | Okuno et al. | 385/17 |
| 5,526,453 A | * | 6/1996 | Wolf et al. | 385/42 |
| 5,862,279 A | * | 1/1999 | Amersfoort et al. | 385/40 |
| 6,229,943 B1 | | 5/2001 | Okayama | |
| 6,268,949 B1 | * | 7/2001 | Cho et al. | 359/254 |
| 6,920,266 B2 | * | 7/2005 | Blume | 385/43 |
| 7,302,135 B2 | * | 11/2007 | Melloni et al. | 385/28 |
| 7,343,104 B2 | * | 3/2008 | Doerr et al. | 398/212 |
| 8,346,025 B2 | * | 1/2013 | Gill | 385/3 |
| 8,406,578 B2 | * | 3/2013 | Oikawa et al. | 385/3 |
| 2003/0012479 A1 | * | 1/2003 | Kitou et al. | 385/14 |
| 2004/0090665 A1 | * | 5/2004 | Futami et al. | 359/349 |
| 2006/0159384 A1 | * | 7/2006 | Sugiyama | 385/3 |
| 2009/0202247 A1 | * | 8/2009 | Okayama | 398/79 |
| 2010/0166427 A1 | | 7/2010 | Jeong | |
| 2012/0002921 A1 | * | 1/2012 | Jeong | 385/32 |

FOREIGN PATENT DOCUMENTS

| | | |
|---|---|---|
| JP | 02-244105 | 9/1990 |
| JP | 04-213407 | 8/1992 |
| JP | 10-300958 | 11/1998 |
| JP | 2003-014958 | 1/2003 |
| JP | 2004-144963 A | 5/2004 |
| JP | 2005-010333 | 1/2005 |
| JP | 2005-249973 A | 9/2005 |
| JP | 2006-293345 A | 10/2006 |
| JP | 2010-171922 | 8/2010 |

\* cited by examiner

*Primary Examiner* — Charlie Peng
(74) *Attorney, Agent, or Firm* — Fujitsu Patent Center

(57) ABSTRACT

The optical waveguide device includes a first optical coupler which branches input light and outputs first signal light and second signal light, an optical phase shifter including a first and a second optical waveguides of optical path lengths different from each other and giving a phase difference between the first signal light and the second signal light, and the second optical coupler coupling the first signal light outputted from the first optical waveguide and the second signal light outputted from the second optical waveguide. The first optical waveguide and the second optical waveguide have the same waveguide width and have optical waveguides bent with substantially the same radius of curvature.

18 Claims, 22 Drawing Sheets

CASE THAT WAVEGUIDE
WIDTH (W) IS LARGER
THAN PRESCRIBED VALUE

CASE THAT WAVEGUIDE
WIDTH (W) IS SMALLER
THAN PRESCRIBED VALUE

OPTICAL WAVEGUIDE DEVICE AND OPTICAL HYBRID CIRCUIT

CROSS REFERENCE TO RELATED APPLICATIONS

This application is based upon and claims the benefit of priority of the prior Japanese Patent Application No. 2011-067280, filed on Mar. 25, 2011, the entire contents of which are incorporated herein by reference.

FIELD

The embodiments discussed herein are an optical waveguide device and an optical hybrid circuit to be used in optical communication systems.

BACKGROUND

In optical communication systems, for a variety of the signal processing, various optical waveguide devices are used. Such optical waveguide devices are represented by, e.g., optical branch/coupling devices, for branching into optical signals by arbitrary ratios, etc. As an optical branch/coupling device for obtaining an arbitrary optical branching ratio is known an optical waveguide device including two 2:2 optical couplers and an optical phase shifter provided between the optical couplers and having two waveguides for giving a phase difference.

As techniques for giving a phase difference to two optical waveguides of the optical phase shifter are proposed, e.g., the technique of providing linear waveguide regions of a relatively small width to control the lengths of the regions, the technique of forming two waveguides in tapered waveguides of different taper angles, the technique of providing in one waveguide a delay interferometer formed of a bent optical waveguide, and other techniques.

The followings are examples of related: Japanese Laid-open Patent Publication No. 2004-144963; Japanese Laid-open Patent Publication No. 2005-249973; and Japanese Laid-open Patent Publication No. 2006-293345.

However, the countermeasures against the manufacturing tolerance are not considered enough in the above-described techniques. Thus, the phase change amounts are often greatly shifted by the variations in manufacturing the waveguides, etc. from the prescribed phase change amount, and the expected characteristics cannot be achieved.

SUMMARY

According to one aspect of an embodiment, there is provided an optical waveguide device including a first optical coupler branching an input light to output a first signal light and a second signal light, an optical phase shifter for giving a phase difference between the first signal light and the second signal light including: a first optical waveguide connected to the first optical coupler and propagating the first signal light, and a second optical waveguide having an optical path length different from that of an optical path length of the first optical waveguide, connected to the first optical coupler and propagating the second signal light, and a second optical coupler for coupling the first signal light outputted from the first optical waveguide and the second signal light outputted from the second optical waveguide connected to the first optical waveguide and the second optical waveguide of the optical phase shifter, wherein the first optical waveguide has a first waveguide width and is a bent optical waveguide bent at a first radius of curvature, the second optical waveguide has a second waveguide width and is a bent optical waveguide bent at a second radius of curvature, the first waveguide width and the second waveguide width are equal to each other, and the difference between the first radius of curvature and the second radius of curvature are in the range of ±20%.

The object and advantages of the embodiment will be realized and attained by means of the elements and combinations particularly pointed out in the claims.

It is to be understood that both the foregoing general description and the following detailed description are exemplary and explanatory and are not restrictive of the embodiments, as claimed.

DESCRIPTION OF EMBODIMENTS

A First Embodiment

An optical waveguide device and a method of manufacturing the same according to a first embodiment will be described with reference to FIGS. 1 to 11.

Figure 1:
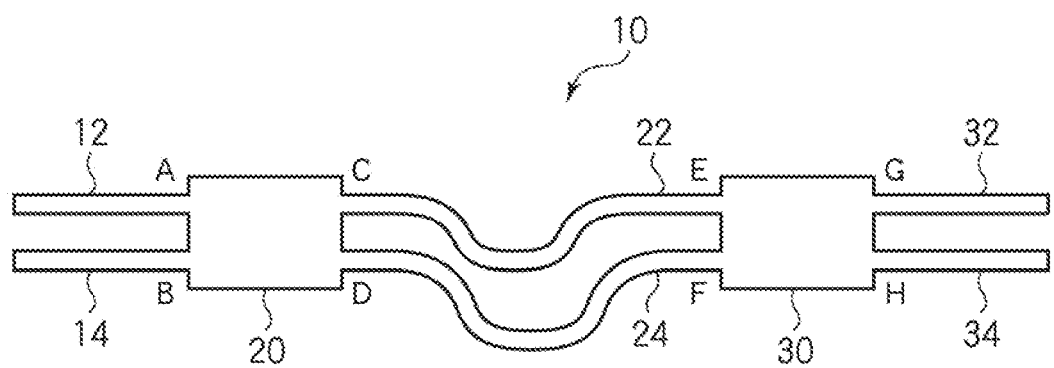
FIG. 1 is a plan view illustrating a structure of an optical waveguide device according to a first embodiment (Part 1)
Figure 2:
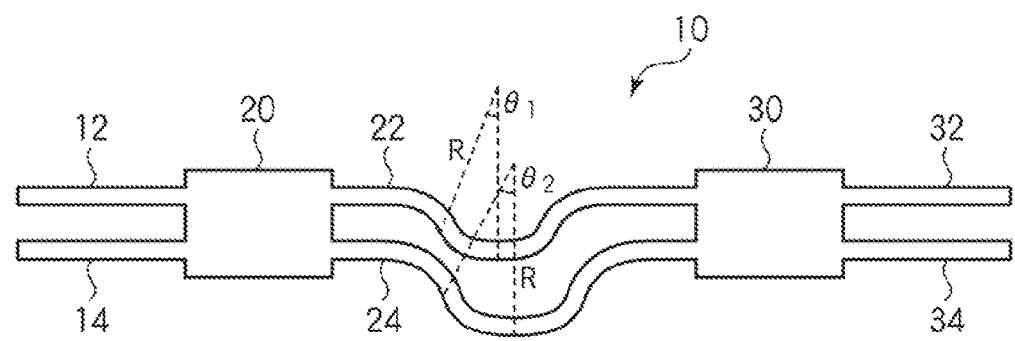
FIG. 2 is a plan view illustrating a structure of an optical waveguide device according to a first embodiment (Part 2)
Figure 3:
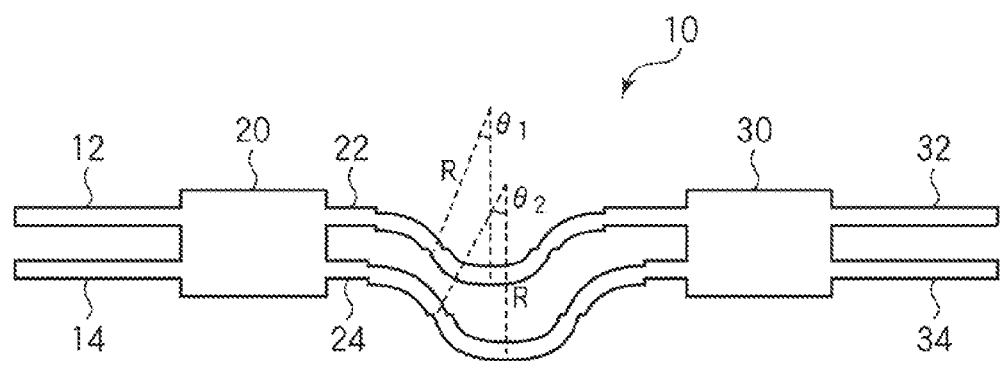
FIG. 3 is a plan view illustrating a structure of an optical waveguide device according to a first embodiment (Part 3)
Figure 4:
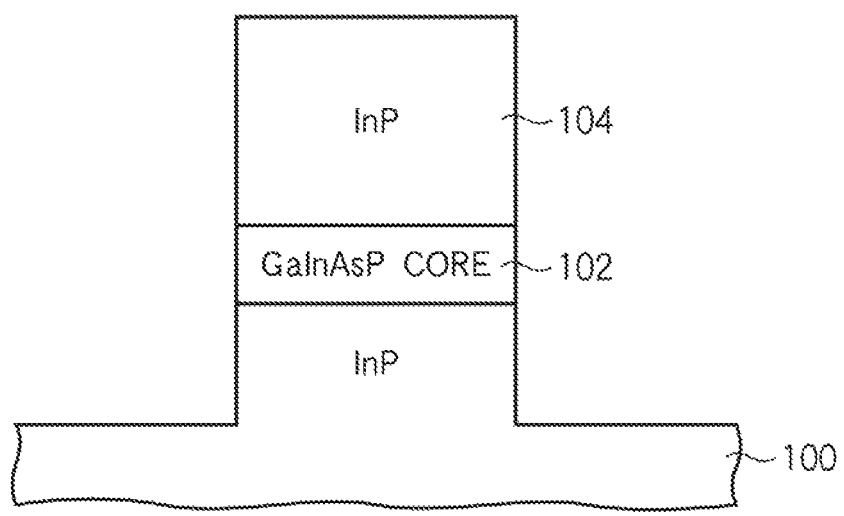
FIG. 4 is a diagrammatic sectional view illustrating the optical waveguide device according to the first embodiment.
Figure 5:
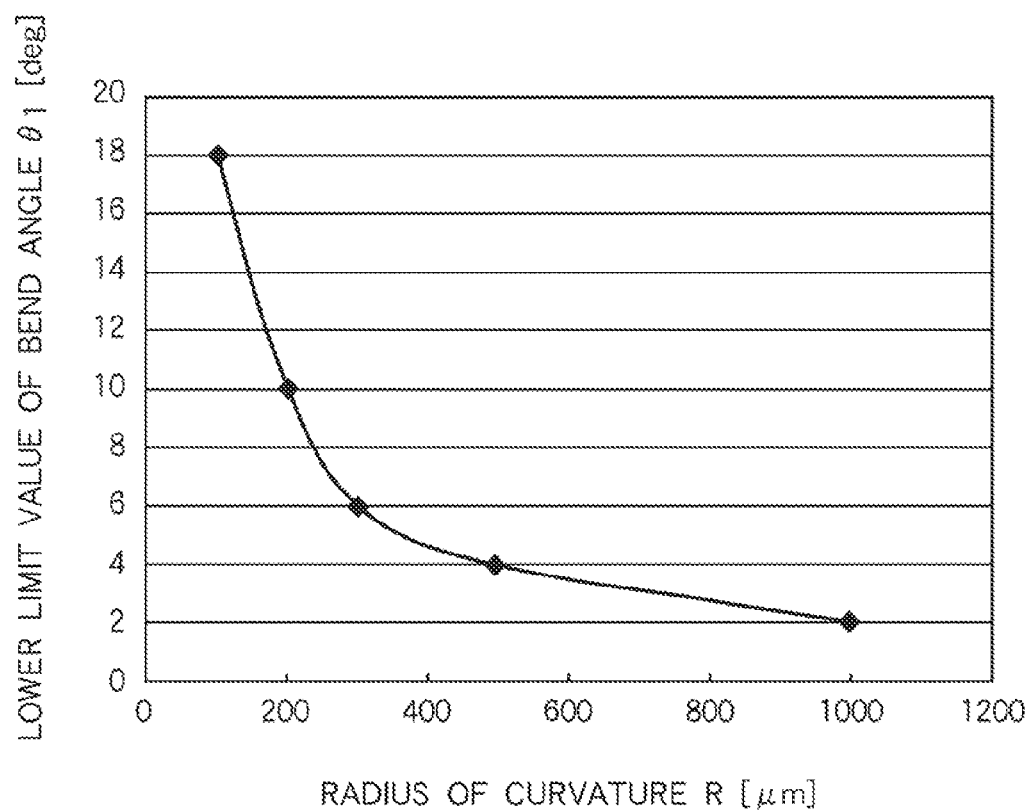
FIG. 5 is a graph illustrating the relationships between the lower limit value of the bend angle $\theta_1$ and the radius of curvature R of the optical waveguide given by simulation.
Figure 6A:
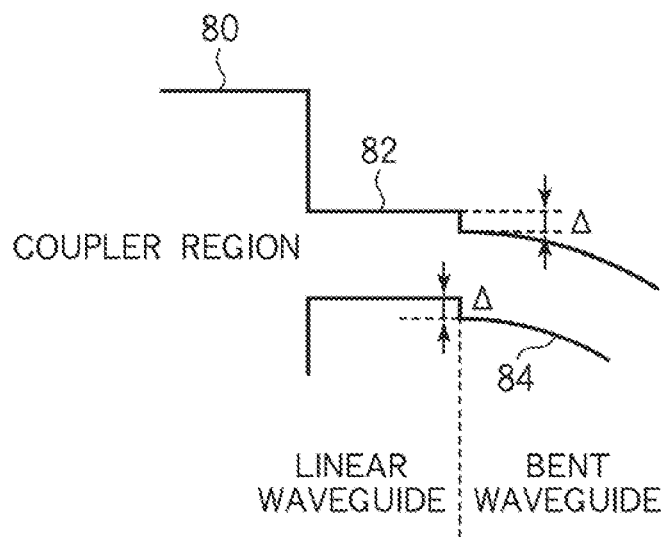
FIGS. 6A and 6B are views explaining the offset of the optical waveguide.
Figure 6B:
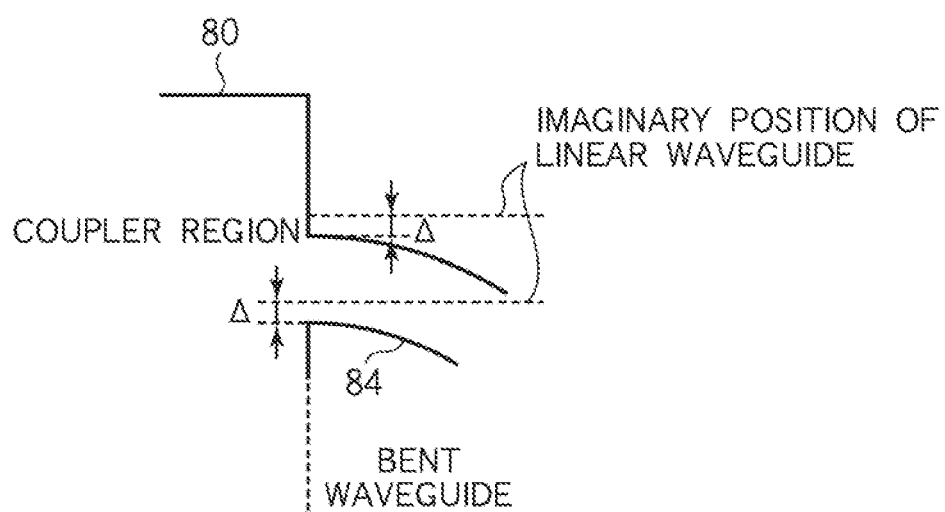
Figure 7A:
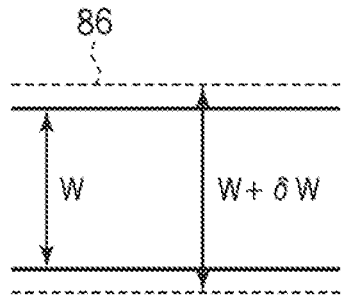
FIGS. 7A and 7B are views explaining variations of the width of the optical waveguide due to the fluctuations in manufacturing.
Figure 7B:
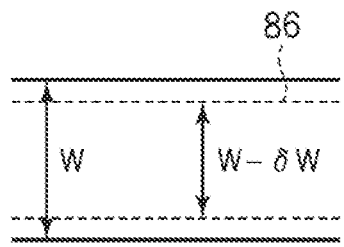
Figure 8:
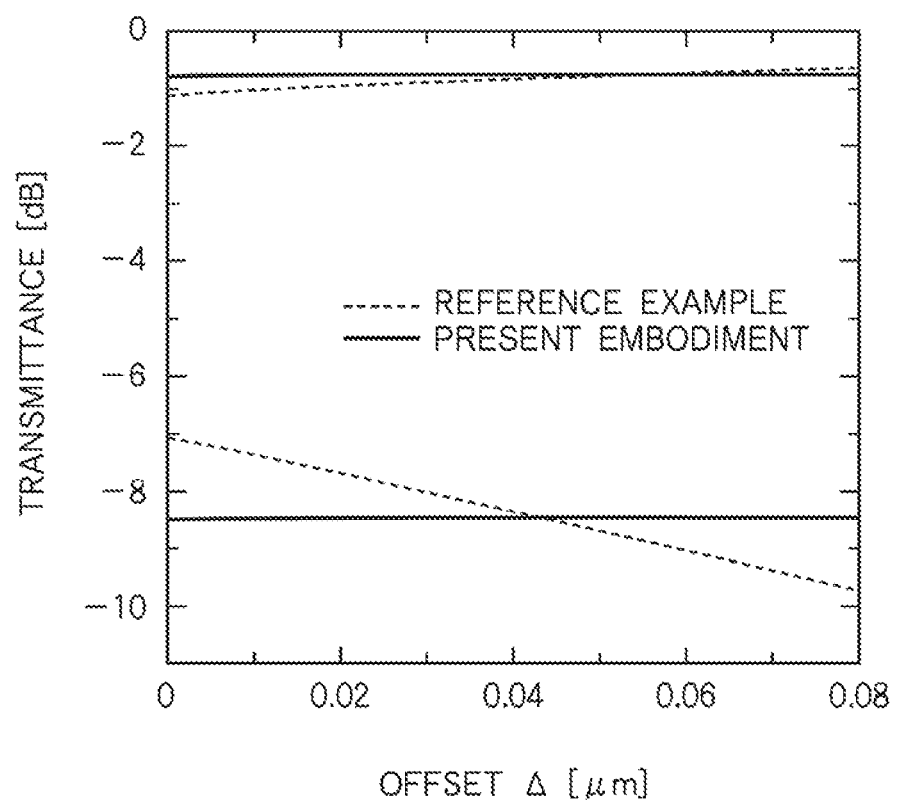
FIG. 8 is a graph illustrating the relationships between the offset between the optical coupler and the bent optical waveguide and the branch characteristics given by simulation.
Figure 9:
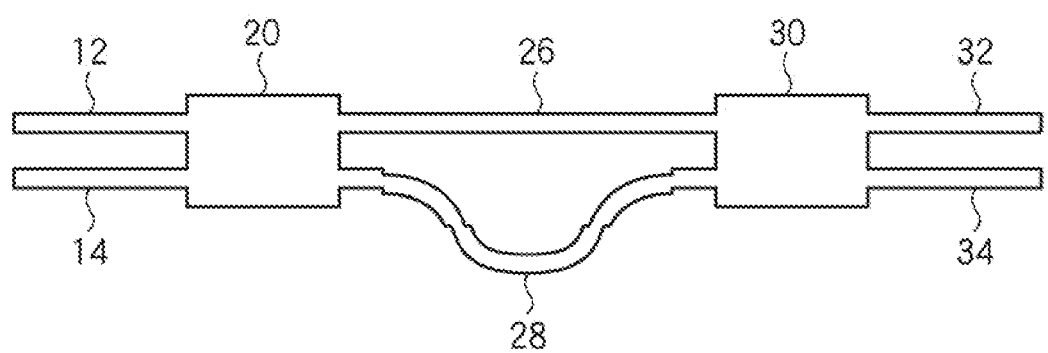
FIG. 9 is a plan view illustrating a structure of the optical waveguide device according to reference example (Part 1)
Figure 10:
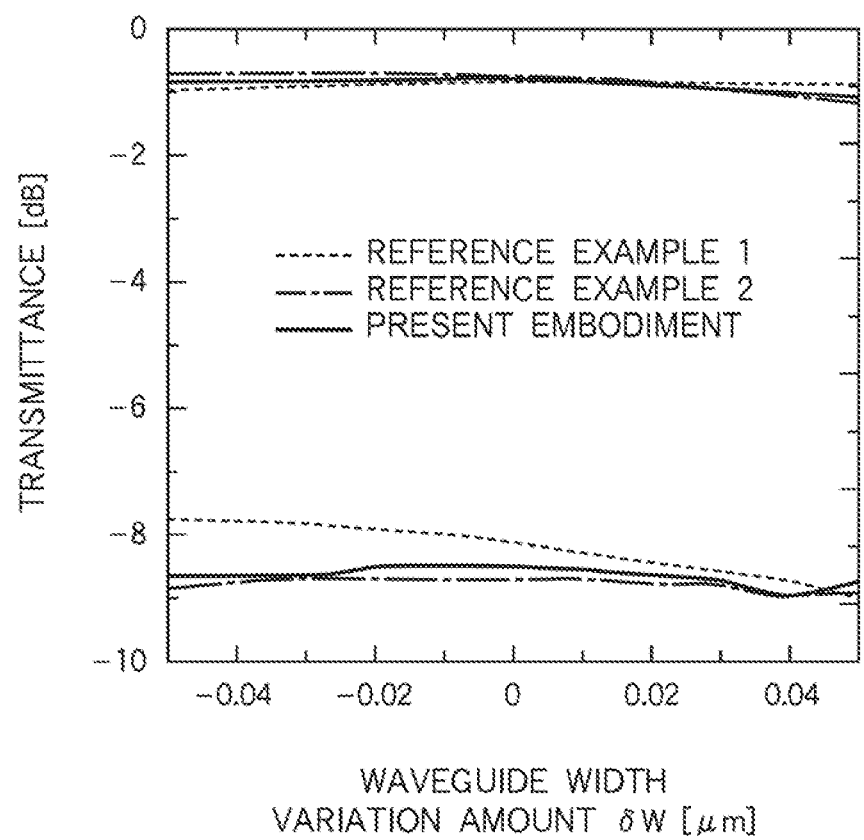
FIG. 10 is a graph illustrating the relationships between the variation of the waveguide width from the design value and the branch characteristics given by simulation.
Figure 11:
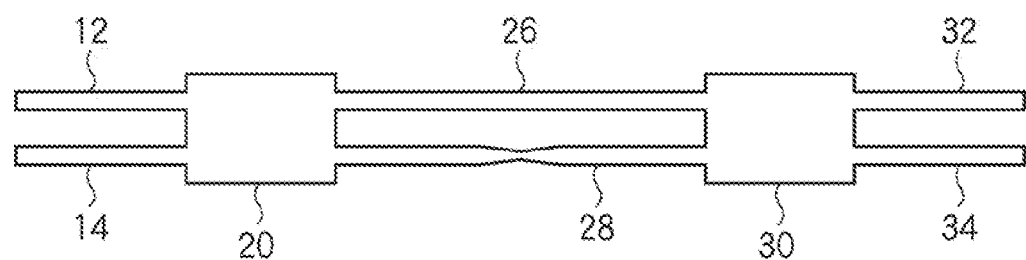
FIG. 11 is a plan view illustrating a structure of the optical waveguide device according to reference example (Part 2)

FIGS. 1-3 are a plan view illustrating the structure of an optical waveguide device according to the present embodiment. FIG. 4 is a diagrammatic sectional view illustrating the optical waveguide device according to the present embodiment. FIG. 5 is a graph illustrating the relationships between the lower limit value of the bend angle $\theta_1$ and the radius of curvature R of the optical waveguide given by simulation. FIGS. 6A and 6B are views explaining the offset of the optical waveguide. FIGS. 7A and 7B are views explaining variations of the width of the optical waveguide due to the fluctuations in manufacturing. FIG. 8 is a graph illustrating the relationships between the offset between the optical coupler and the bent optical waveguide and the branch characteristics given by simulation. FIGS. 9 and 11 are a plan view illustrating a structure of the optical waveguide device according to reference example. FIG. 10 is a graph illustrating the relationships between the variation of the waveguide width from the design value and the branch characteristics given by simulation.

First, the structure of the optical waveguide device according to the present embodiment will be described with reference to FIGS. 1 to 5.

As illustrated in FIG. 1, the optical waveguide device 10 according to the present embodiment includes MMI (Multi-Mode Interference) type optical couplers 20, 30, optical waveguides 12, 14 which input the signal light into the optical coupler 20, optical waveguides 22, which interconnect the optical couplers 20, 30, and optical waveguides 32, 34 which output the signal light from the optical coupler 30.

The optical coupler 20 is an MMI-type 3-dB optical coupler having two input ports A, B and two output ports C, D and branches a light signal inputted from the optical waveguide 12 connected to the input port A or the optical waveguide 14 connected to the input port B equally into the output ports C, D.

The optical waveguide 22 and the optical waveguide 24 have one ends connected respectively to the output port C and the output port D of the optical coupler 20 and have the other ends connected respectively to the input port E and the input port F of the optical coupler 30. The optical waveguide 22 and the optical waveguide 24 have the same waveguide width and different optical path lengths.

As illustrated in FIG. 2, the optical waveguide and the optical waveguide 24 have bent optical waveguides of substantially the same radius of curvature R. In the optical waveguide having plural bent portions, as in the optical waveguide 22 and the optical waveguide of the optical waveguide device according to the present embodiment, the radius of curvature of these bent portions are made substantially the same.

The optical path difference between the optical waveguide 22 and the optical waveguide 24 can be generated by, e.g., differing the respective bend angles ($\theta_1$ and $\theta_2$) from each other. For example, by making the bend angle $\theta_2$ of the optical waveguide 24 larger than the bend angle $\theta_1$ of the optical waveguide 22, the optical path length of the optical waveguide 24 can be made longer than the optical path length of the optical waveguide 22. Between the optical waveguide 22 and the optical waveguide 24, a prescribed phase difference corresponding to an optical path difference can be obtained by suitably adjusting the bend angles ($\theta_1$ and $\theta_2$). In the present embodiment, the bend angle corresponds to the center angle of a sector formed by connecting the center of curvature of the bent optical waveguide and the ends of the bent optical waveguide (see FIG. 2).

As exemplified in FIG. 3, in the optical waveguide 22 and the optical waveguide 24, offsets may be provided at the parts where the configuration of the waveguides is changed. The bent optical waveguides may be connected directly to the optical couplers 20, 30. As exemplified in FIG. 3, the bent optical waveguides may be connected to the optical couplers 20, 30 via the linear waveguides.

The optical coupler 30 is an MMI-type 3-dB optical coupler having two input ports E, F and two output ports G, H. To the input port E and the input port F, the other ends of the optical waveguide 22 and the optical waveguide 24 are respectively connected, and the optical waveguide 32 and the optical waveguide 34 are connected respectively to the output port G and the output port H. The optical coupler 30 outputs to the optical waveguides 32, 34 light signals with a branching ratio corresponding to phase difference between the light signals inputted from the optical waveguides 22, 24.

The optical waveguide device 10 illustrated in FIG. 1 is a high-mesa waveguide formed by the layer body of an InP substrate 100 as the lower clad layer, a GaInAsP core layer 102 and an InP layer 104 as the upper clad layer patterned in a mesa shape.

As described above, in the optical waveguide device 10 according to the present embodiment, as the optical waveguide 22 and the optical waveguide 24 giving a phase difference to two output light signals from the optical coupler 20, the bent optical waveguides, which are the same in the waveguide width and substantially the same in the radius of curvature and are different from each other in the bend angle, are used.

For example, when the radius of curvature is 500 μm, the bend angle $\theta_1$ is 4.0 degrees, and the bend angle $\theta_2$ is 4.62 degrees, an optical path difference of about 61.3 nm is generated between the optical waveguide 22 and the optical waveguide 24. The phase difference given by this is about 0.253 π [rad]. That is, the signal light to be outputted from the optical waveguide 24 is delayed to the signal light to be outputted from the optical waveguide 22 by 0.253 π [rad] in the phase.

As the waveguides forming the optical waveguide and the optical waveguide 24, the bent optical waveguides of the same radius of curvature are used so that when higher order mode or higher order leaky mode are excited in the bent optical waveguides, the same modes excite and attenuate each other. This enables a phase shift amount between the optical waveguide 22 and the optical waveguide 24 to be retained.

In view of this, preferably, the bent optical waveguide forming the optical waveguide 22 and the bent optical waveguide forming the optical waveguide 24 have the same radius of curvature but may not essentially have the same radius of curvature as long as a radius of curvature is in the range which enables an excited mode in the optical waveguide 22 and an excited mode in the optical waveguide 24 to effectively attenuate each other. "Substantially the same radius of curvature" means a range which enables an excited mode in the optical waveguide 22 and an excited mode in the optical waveguide to effectively attenuate each other, and prescribed characteristics can be obtained.

For example, considering that the optical waveguide device according to the present embodiment is applied to the 90-degree optical hybrid circuit described in, e.g., a second embodiment or a fourth embodiment to be described later, it is preferable to suppress the Q-channel imbalance to be within ±0.3 dB. The allowable range of the difference between the radius of curvature of the bent optical waveguide of the optical waveguide 22 and the radius of curvature of the bent optical waveguide of the optical waveguide 24 was computed in terms of suppressing the Q-channel imbalance to be within ±0.3 dB, and the allowable range was within about ±20%. That is, the difference between the radius of curvature of the bent optical waveguide of the optical waveguide 22 and the radius of curvature of the bent optical waveguide of the optical waveguide 24 is set at within ±20%, whereby the Q-channel imbalance can be suppressed to be within ±0.3 dB. This means that the difference between the radius of curvature of the bent optical waveguide of the optical waveguide 22 and the radius of curvature of the optical waveguide of the optical waveguide 24 to be set at within ±20%, whereby an excited mode in the optical waveguide 22 and an excited mode in the optical waveguide 24 can effectively attenuate each other.

The value of the radius of curvature R depends on waveguide parameters used and cannot be unconditionally defined, but for the optical waveguide device of the high-mesa waveguide structure as in the present embodiment, preferably, the lower limit values is about 100 µm. As the radius of curvature R is smaller, the excessive loss increases, which makes it difficult to obtain the Q-channel balance in the application to, e.g., a 90-degree optical hybrid circuit. The lower limit value described above was computed on the premise that the Q-channel imbalance can be suppressed to be within ±0.3 dB.

As the radius of curvature becomes smaller, and the optical waveguide 22 infinitely approaches the linear waveguide, higher order mode or higher order leaky mode are not easily excited in the optical waveguide 22, and the effect of compensating the modes excited in the optical waveguides 24 is impaired. In view of this, preferably, the lower limit value of the bend angle $\theta_1$ of the optical waveguide 22 is set corresponding to a value of the radius of curvature R.

FIG. 5 is a graph illustrating the relationships between the lower limit value of the bend angle $\theta_1$ of the optical waveguide 22 and the radius of curvature R given by simulation.

As illustrated in FIG. 5, the lower limit value of the bend angle $\theta_1$ decreases as the radius of curvature R increases. For example, when the radius of curvature R is 100 µm, the lower limit value of the bend angle $\theta_1$ is 18 degrees. When the radius of curvature R is 200 µm, the lower limit value of the bend angle $\theta_1$ is 10 degrees. When the radius of curvature R is 300 µm, the lower limit value of the bend angle $\theta_1$ is 6 degrees. When the radius of curvature R is 500 µm, the lower limit value of the bend angle $\theta_1$ is 4 degrees. When the radius of curvature R is 1000 µm, the lower limit of the bend angle $\theta_1$ is 2 degrees.

The bend angle $\theta_2$ of the optical waveguide 24 is set at a value larger than the bend angle $\theta_1$ of the optical waveguide 22, which is suitably selected so that a prescribed phase difference can be obtained by an optical path difference from the optical waveguide 22.

Next, the manufacturing tolerance of the optical waveguide device according to the present embodiment will be described with reference to FIGS. 6A to 11.

The waveguide parameters of the optical waveguide device often deviate from the design values due to fluctuations, etc. in the manufacture.

For example, a case that the offset at the input/output port of the optical coupler deviates from a prescribed value due to manufacturing errors, a case that a theoretically estimated value of the offset deviates from the empirical value, or other cases are considered. The offset is an offset Δ provided between the linear waveguide 82 and the bent optical waveguide 84 in the case that the linear waveguide 82 is positioned between the optical coupler 80 and the bent optical waveguide 84 as exemplified in FIG. 6A. Otherwise, as exemplified in FIG. 6B, the offset is an offset Δ of the bent optical waveguide 84 to a imaginary position of the linear waveguide in the case that the bent optical waveguide 84 is connected directly to the optical coupler 80.

A case, for example that the width itself of the optical waveguide deviates from a prescribed value is considered. For example, as illustrated in FIG. 7A, a case that the width of the completed optical waveguide 86 is W+δW which is wider than a design value W is considered. Otherwise, as illustrated in FIG. 7B, a case that the width of the completed optical waveguide 46 is W−δW which is smaller than the design value W is considered.

When the waveguide parameters deviate from the design values due to these causes, the phase shift amount deviates from the design value, and the branching ratio cannot be retained constant.

FIG. 8 is the graph illustrating the relationships between the offset between the optical coupler and the bent optical waveguide, and the branch characteristics given by simulation. In the graph, the solid lines indicate the characteristics of the optical waveguide device according to the present embodiment illustrated in FIG. 3 ("PRESENT EMBODIMENT" in the graph), and the dotted lines indicate the characteristics of the optical waveguide device according to the reference example illustrated in FIG. 9 ("REFERENCE EXAMPLE" in the graph).

As illustrated in FIG. 9, the optical waveguide device according to the reference example is the same as the optical waveguide device according to the present embodiment illustrated in FIG. 3 except that two optical waveguides 26, 28 of the reference example, which provides a phase difference are different. The optical waveguide device of the reference example includes two waveguides 26, 28 that give a phase difference. One waveguide 26 is formed by a linear optical waveguide and the other waveguide 28 is formed by a bent optical waveguide. The optical waveguide 28 is a bent optical, whereby the optical path length of the optical waveguide 26 and the optical path length of the optical waveguide can be different, and a phase difference can be provided between signal light outputted from the optical waveguide 26 and signal light outputted from the optical waveguide 28.

In the computation example shown in FIG. 8, a phase shift amount between signal light passing through the optical waveguide 22 and signal light passing through the optical waveguide 24 and a phase shift amount between signal light passing through the optical waveguide 26 and signal light passing through the optical waveguide 28 were set at −π/4 [rad]. The offset Δ between the linear optical waveguide and the bent optical waveguide was defined with the linear optical waveguides being formed between the optical coupler 20 and the bent optical waveguides of the optical waveguides 22, 24, 28 and between the optical coupler 30 and the bent waveguides of the optical waveguides 22, 24, 28 (see FIG. 6A).

As the structure of the optical waveguide device, the high-mesa waveguide structure as illustrated in FIG. 4 is assumed, and the energy band gap wavelength λg of the GaInAsP core layer was set at 1.05 μm, and the input/output waveguide width was set at 2.5 μm. The respective optical waveguide devices were optimized to operate to satisfy single mode conditions and branch signal light asymmetrically in the ratio of 85:15.

The optical waveguide device according to the present embodiment illustrated in FIG. 3 and the optical waveguide device of the reference example use the optical waveguides as the delay interferometer, which causes a risk of mode fluctuations. The characteristics degradation due to the mode fluctuations can be decreased usually by optimizing the offset Δ in a limited range. In this case, the optimum offset Δ for all the optical waveguide devices was estimated to be about 0.04 μm. However, there is a risk that the optimum offset Δ is not always a fixed value, depending on errors in the manufacture.

As illustrated in FIG. 8, in the optical waveguide device of the reference example, as the offset Δ shifts from the optimum value, 0.04 μm, the ratio of coupling with the cross port (85%, −0.75 dB loss) and the ratio of coupling with the bar port (15%, ~8.3 dB loss) drastically shift. The shift amounts are even ±5% and ±23% in the range where the offset Δ changes to ±0.04 μm. A cause for such large shift of the characteristic with respect to the offset Δ is that as the offset Δ more shifts from the optimum offset Δ, higher order modes or higher order leaky mode are excited in the bent optical waveguide, whereby a prescribed phase shift amount due to the optical path difference ΔLps between the optical waveguides 26, 28 varies.

In the optical waveguide device according to the present embodiment, however, as shown in FIG. 8, although the offset Δ shifts from the optimum value (0.04 μm) by about ±0.04 μm, the ratios of coupling to the cross port and the bar port does not substantially shift. The shift amount for the optimum value is within about ±1% in all the output channels. This is because in the optical waveguide device according to the present embodiment as well, higher order modes or higher order leaky modes are excited in the bent optical waveguides as the offset Δ more shifts from the optimum offset Δ, but the same modes excite each other in the bent optical waveguides of both arms, whereby a prescribed phase shift amount is retained.

In the computation example of FIG. 8, the case that the linear waveguides are present before and after the bent optical waveguides between the optical couplers 20, 30 was assumed, the above is the same with the case that, as exemplified in FIG. 6B, the bent optical waveguides are connected directly to the optical couplers 20, 30. The same characteristics as in FIG. 8 can be obtained when the coupler design (e.g., the MMI width and MMI length) are proper.

When the coupler design is not proper, however, providing the linear waveguides before and after the bent optical waveguides between the optical couplers 20, 30 tends to facilitate providing prescribed characteristics. For example, in the case that the MMI coupler design becomes improper due to the input light wavelength dependency, manufacturing errors, etc., mode distributions of the input/output channels of the MMI couplers shift from the mode distributions due to prescribed self-imaging. When their propagating modes are inputted as they are into the bent optical waveguides, losses due to the mode mismatches are produced even if the offset Δ is proper, which makes difficult improvement to the prescribed characteristics.

The optical waveguide device according to the present embodiment is superior in the manufacturing tolerance for the fluctuations of the waveguide width W illustrated in FIG. 7.

FIG. 10 is a graph illustrating the relationships between the variation from the design value of the waveguide width and the branching characteristic given by simulation. In the graph, the solid lines indicate the characteristic of the optical waveguide device according to the present embodiment illustrated in FIG. 3 ("PRESENT EMBODIMENT" in the graph). The dotted lines indicate the characteristic of the optical waveguide device of the first reference example illustrated in FIG. 11 ("REFERENCE EXAMPLE 1" in the graph). The one-dot chain lines indicate the characteristic of the optical waveguide device of the second reference example illustrated in FIG. 9 ("REFERENCE EXAMPLE 2" in the graph). The computation conditions used in the simulation are the same as those used in the simulation of FIG. 8.

As illustrated in FIG. 11, the optical waveguide device of the first reference example is the same as the optical waveguide device according to the present embodiment illustrated in FIG. 3 except that two waveguides 26, 28 are different. In the waveguide device of the first reference example, one optical waveguide 26 of the two optical waveguides 26, 28, which give a phase difference, is formed by a linear waveguide, and the other optical waveguide 28 is formed by a tapered waveguide having a tapered region at a part.

As illustrated in FIG. 10, when the waveguide width is as designed, that is, the variation amount δW from the design value of the waveguide width is 0 μm, the branching ration of the optical waveguide device is approximate to the design value (85:15) irrespective of the configurations of both arms. However, when the variation amount δW shifts in the range of −0.05 μm~+0.05 μm, the branching ratio of the optical waveguide device largely shifts, depending on the waveguide configurations of the both arms.

In the optical waveguide device of the first reference example having the optical phase shifter provided by a tapered waveguide, the ratio of coupling with the cross port (85%: ~0.7 dB) does not much influence the shift amount δW. However, the ratio of coupling with the bar port (15%: ~8.3 dB) shifts linearly with respect to the shift amount δW, and the shift percentage is even about 11%.

As described above, in the optical waveguide device having the optical phase shifter provided by a tapered waveguide, when the waveguide width shifts from the design value, the phase shift amount in the tapered region shifts from the prescribed value, and the branching ratio cannot be retained constant.

In the case that the optical phase shifter is provided by a tapered waveguide, the ratio of the characteristics degradation ($FM_1$) can be expressed by formula (1) described below. In formula (1), ko represents a wave number in vacuum; $L_{PS}$ represents a phase shift region length; $δn_1$ and $δn_2$ represent refractive index variations with respect to the variation of the waveguide width of both arms. The bracket < > indicates that the waveguide width of both arms is not constant, and the refractive index locally varies.

$$FM_1 \propto ko(<δn_1>-<δn_2>) \cdot L_{PS} \qquad (1)$$

As expressed in formula (1), to mitigate the characteristics degradation due to the variation of the waveguide width, it is important to decrease ($<δn_1>-<δn_2>$) or $L_{PS}$. However, these parameters have the relationship that when one of them is decreased to obtain a required phase shift, the other must be increased. Accordingly, in the optical waveguide device having the optical phase shifter provided by the tapered waveguide, the increase of the manufacturing tolerance is limited. To overcome such limit, it is most effective to make the propagation constants of both arms equal to each other.

On the other hand, in the optical waveguide device of the second reference example and the optical waveguide device according to the present embodiment, in which both arms of the delay interferometer have the same waveguide width, the ratios of coupling with any output port is suppressed to be within ±2.5% for variations of the shift amount δW. As described above, the waveguide width of both arms of the delay interferometer is the same, whereby the characteristics degradation due to the variation of the waveguide width can be mitigated in comparison with the case that the optical phase shifter is formed by the tapered waveguides.

In the case that the delay interferometer of the bent optical wave guide has both arms of the same waveguide width, the characteristics degradation ratio ($FM_2$) can be expressed by the following formula (2). In formula (2), $n_{eq}$ represents an effective refractive index of the waveguide, and $\Delta L_{PS}$ represents an optical path difference between both arms.

$$FM_2 \propto ko \cdot n_{eq} \cdot \Delta L_{PS} \quad (2)$$

In the comparison between formula (1) and formula (2), the effective refractive index $n_{eq}$ is higher by about 2 places than ($<\delta n_1> - <\delta n_2>$), but the optical path length difference $\Delta L_{PS}$ is smaller by not less than 2 places than $L_{PS}$. Resultantly, the characteristics degradation ratio $FM_2$ can be made lower than the characteristics degradation ratio $FM_1$, and the characteristics degradation due to the variation of the waveguide width can be mitigated.

FIGS. 8 and 10 show the results of the computation with the phase shift amount $\Delta\theta$ being $-\pi/4$ [rad], the characteristics improvement effect of the optical waveguide device according to the present embodiment can be always produced even with the phase shift amount $\Delta\theta$ being arbitrary. Thus, the optical waveguide device according to the present embodiment can drastically improve the manufacturing tolerance to the fluctuation of the propagation mode and the variation of the waveguide width.

In the examples illustrated in FIGS. 1 and 3, the linear waveguides or the bent optical waveguides connected to the MMI couplers is constant but may not be essentially constant. For example, also in the case that the width of the waveguide connected to the MMI coupler region is tapered, the same effect as that produced by the optical waveguide device shown in FIGS. 1 and 3 can be produced.

Next, the method of manufacturing the optical waveguide device according to the present embodiment will be described.

First, a 0.5 μm-thickness undoped GaInAsP core layer 102 and a 2 μm-thickness p-type or undoped InP layer 104 are epitaxially grown above an n-type or undoped InP substrate 100 by, e.g., metal organic vapor phase epitaxy (MOVPE) method (see FIG. 4). The emission wavelength of the GaInAsP core layer 102 is set at, e.g., 1.05 μm.

Then, above the InP layer 104, silicon oxide film (not illustrated) to be the mask is deposited by, e.g., evaporation method.

Next, a photoresist film (not illustrated) having the waveguide pattern of the optical waveguide device is formed above the silicon oxide film by photolithography.

Then, the silicon oxide film is etched with the photoresist film as the mask, and then, with the patterned silicon oxide film as the mask, the InP layer 104, the GaInAsP core layer 102 and the InP substrate 100 are anisotropically etched by, e.g., ICP reactive ion etching. Thus, the high-mesa waveguide structure of an about 30.0 μm-height is formed, and the optical waveguide device according to the present embodiment is completed.

As described above, according to the present embodiment, two optical waveguides forming an optical phase shifter are provided by optical waveguides having bent optical waveguides of substantially the same waveguide width and radius of curvature, whereby the characteristics degradation due to variation of the waveguide width and mode fluctuation can be prevented. Thus, the manufacturing tolerance can be drastically improved.

A Second Embodiment

An optical waveguide device according to a second embodiment will be described with reference to FIGS. 12 to 19. The same members of the present embodiment as those of the optical waveguide device according to the first embodiment are represented by the same reference numbers not to repeat or to simplify the description.

Figure 12:
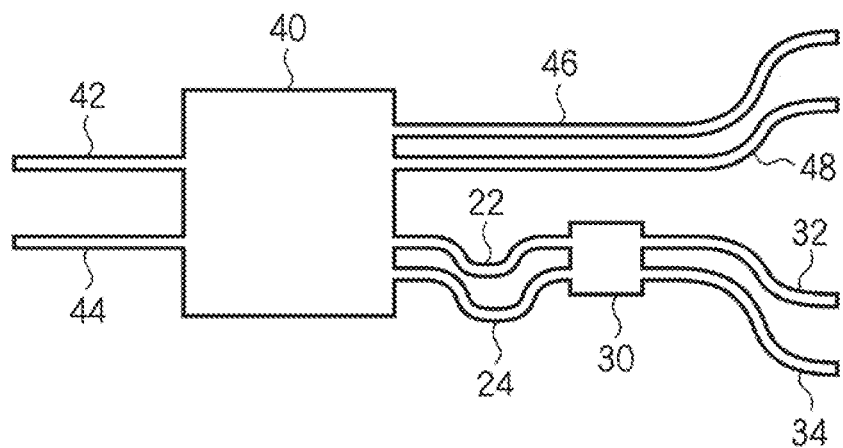
FIG. 12 is a plan view illustrating a structure of an optical waveguide device according to a second embodiment.
Figure 13:
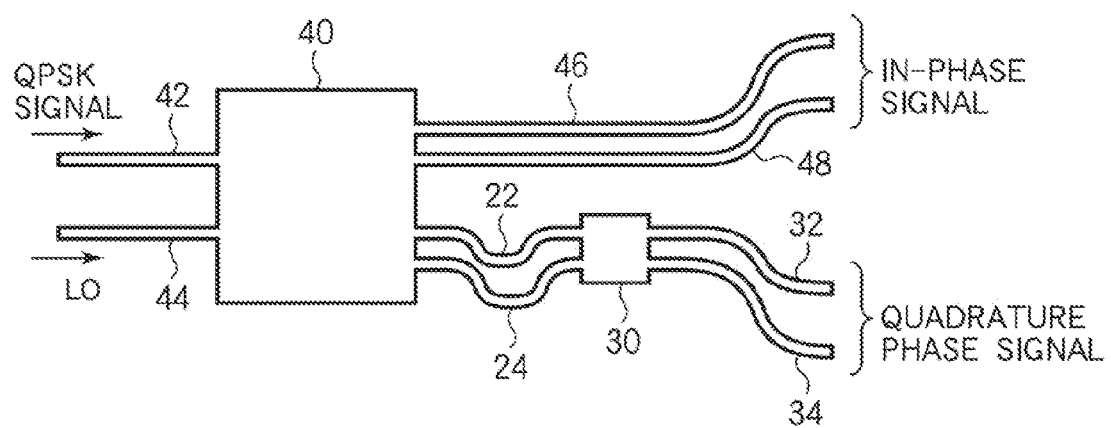
FIG. 13 is a plan view explaining the operation of the optical waveguide device according to the second embodiment.
Figure 14:
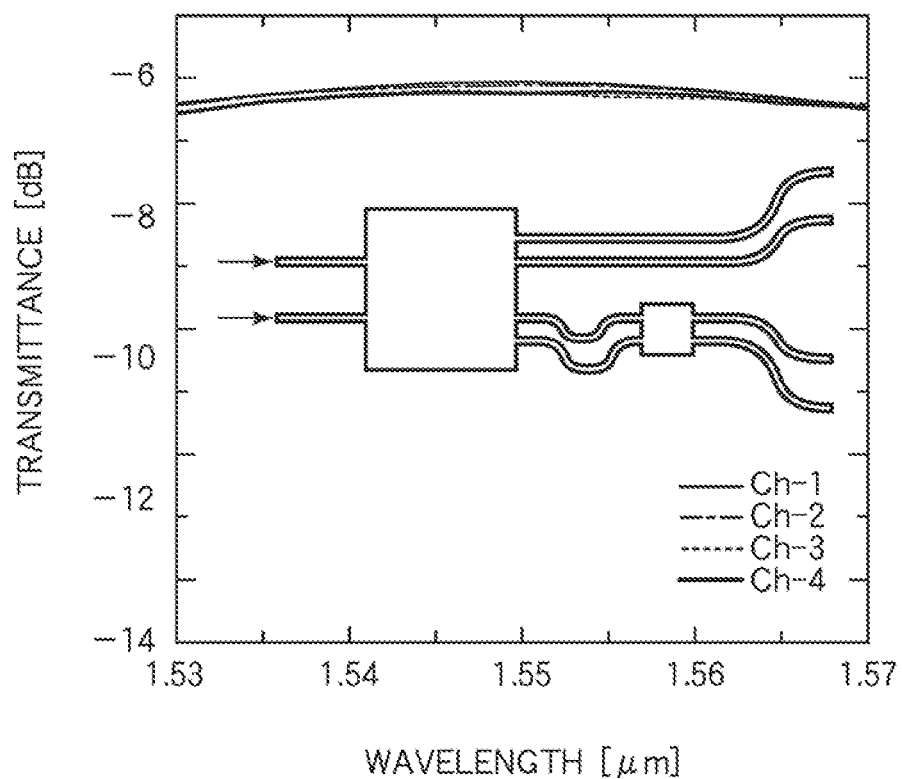
FIG. 14 is a graph illustrating the branching characteristics of the optical waveguide device on the incidence of the optical signal from the input channel (Part 1)
Figure 15:
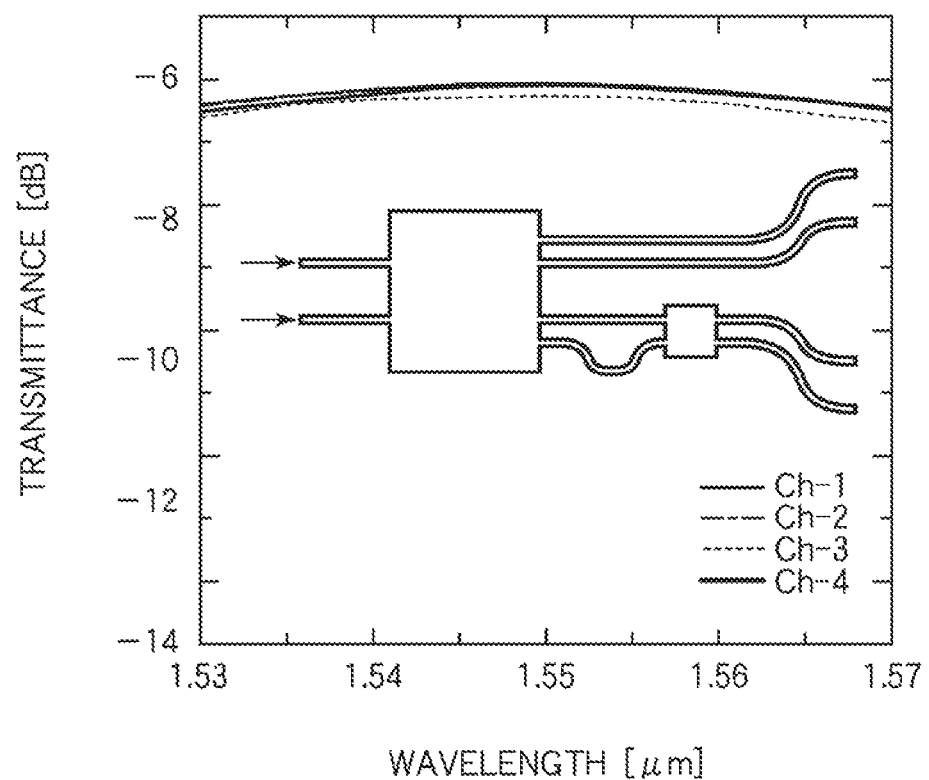
FIG. 15 is a graph illustrating the branching characteristics of the optical waveguide device on the incidence of the optical signal from the input channel (Part 2)
Figure 16:
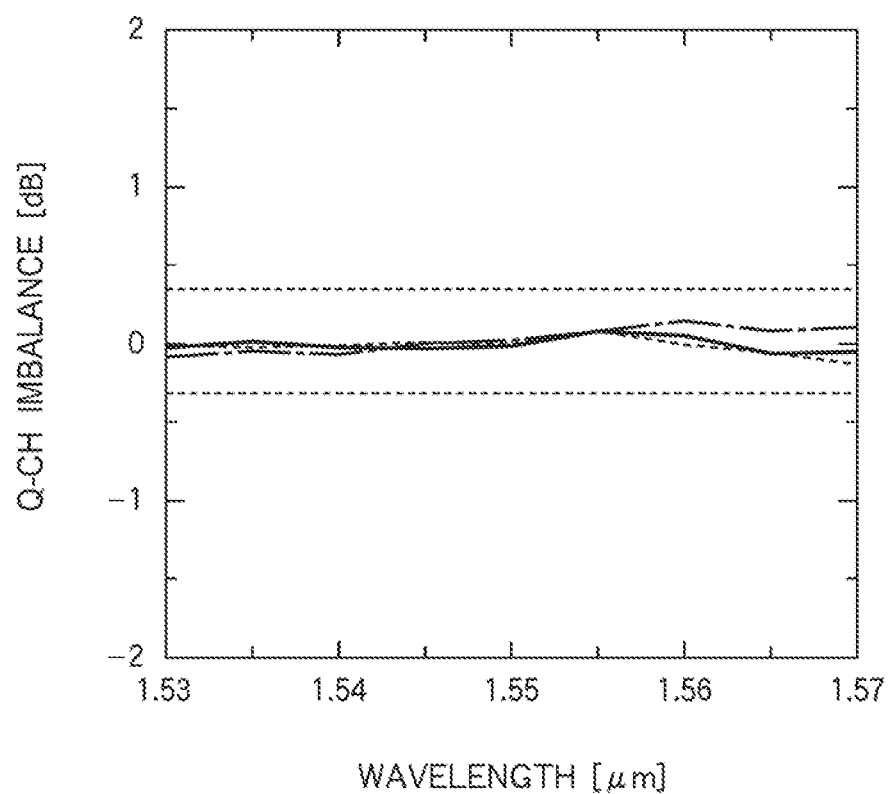
FIG. 16 is a graph illustrating the relationships between the offset of the optical phase shifter region and the Q-ch imbalance (Part 1)
Figure 17:
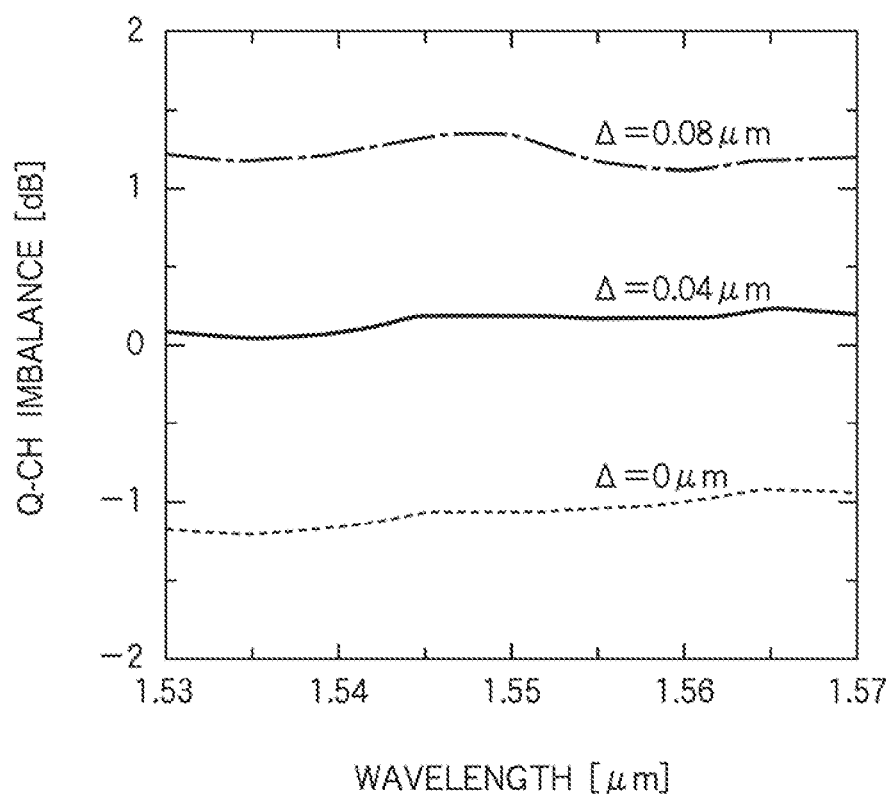
FIG. 17 is a graph illustrating the relationships between the offset of the optical phase shifter region and the Q-ch imbalance (Part 2)
Figure 18:
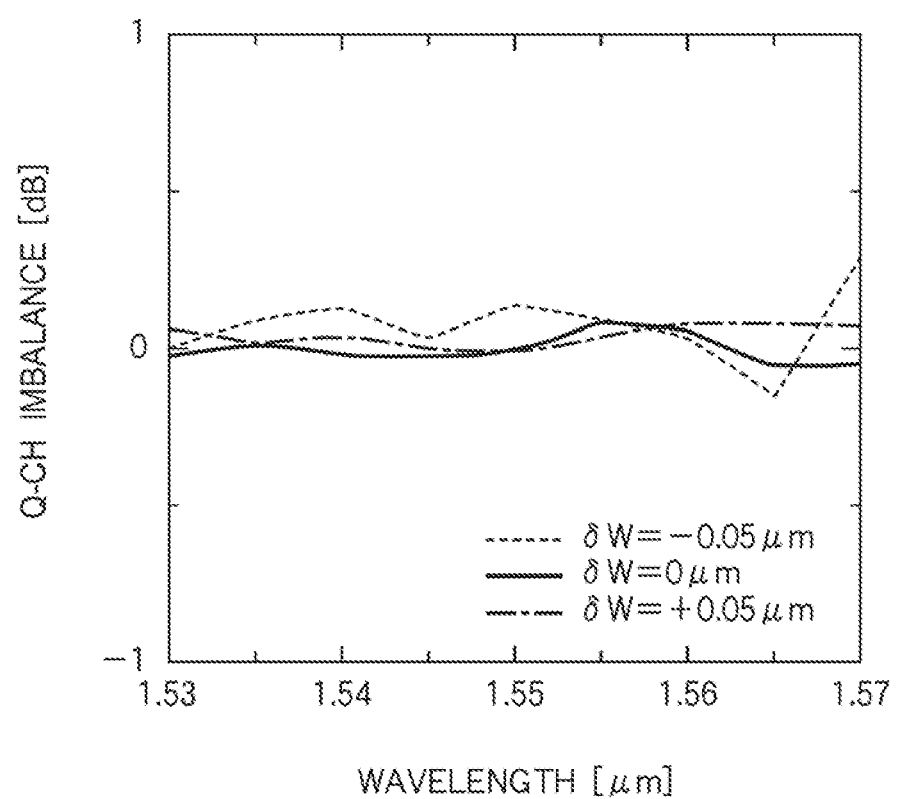
FIG. 18 is a graph illustrating the relationships between the variation amount of the waveguide width and the Q-ch imbalance.
Figure 19:
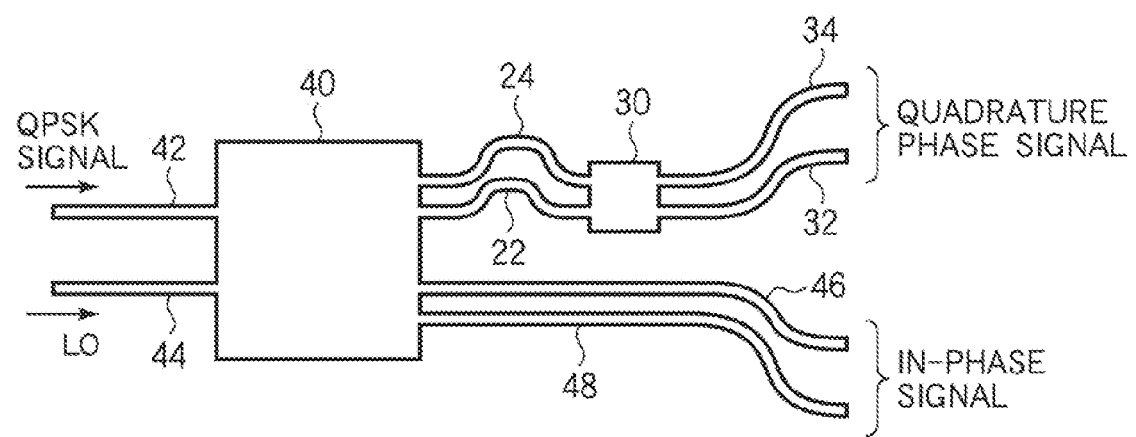
FIG. 19 is a plan view illustrating a structure of an optical waveguide device according to a modification of the second embodiment.

FIG. 12 is a plan view illustrating a structure of the optical waveguide device according to the present embodiment. FIG. 13 is a plan view explaining the operation of the optical waveguide device according to the present embodiment. FIGS. 14 and 15 are graphs illustrating the branching characteristics of the optical waveguide device on the incidence of the optical signal from the input channel. FIGS. 16 and 17 are graphs illustrating the relationships between the offset of the optical phase shifter region and the Q-ch imbalance. FIG. 18 is a graph illustrating the relationships between the variation amount of the waveguide width and the Q-ch imbalance. FIG. 19 is a plan view illustrating a structure of an optical waveguide device according to a modification of the present embodiment.

First, the structure of the optical waveguide device according to the present embodiment will be described with reference to FIG. 12. The optical waveguide device according to the present embodiment is an application of the optical phase shifter of the optical waveguide device according to the first embodiment to a 90-degree optical hybrid circuit for demodulating multi-valued modulated signals.

As illustrated in FIG. 12, the optical waveguide device includes an MMI-type optical coupler 40 having two input ports and four output ports, and an MMI-type optical coupler 30 having two input ports and two output ports. The optical coupler 40 is a 2:4 MMI-type coupler based on paired interference (PI) mode. To the input ports of the optical coupler 40, waveguides 42, 44 are connected. To one pair of the output channels of two pairs of the output channels of the optical coupler 40, optical waveguides 46, 48 are connected. Between the other pair of the output channels of the optical coupler and the input ports of the optical coupler 30, the optical waveguides 22, 24 are connected. The optical waveguides 22, 24 are the same as the optical waveguides 22, 24 of the optical waveguide device according to the first embodiment, and form the optical phase shifter. To the output ports of the optical coupler 30, optical waveguides 32, 34 are connected.

Next, the operation of the optical waveguide device according to the present embodiment will be described with reference to FIG. 13.

As illustrated in FIG. 13, on the input ports of the optical coupler 40, a quadrature phase shift keying (QPSK) signal and a local oscillator (LO) light are incident respectively via the optical waveguide 42 and the optical waveguide 44. Then, the input signals are converted to an in-phase signal to be outputted to the two pairs of the output channels of the optical coupler 40. Of the signal light outputted to the two pairs of the output channels, one pair of output channel components outputted to the optical waveguides 22, 24 is converted to quadrature phase signals by the optical waveguides 22, 24, which are the optical phase shifter, and the optical coupler 30. Thus, the optical waveguide device according to the present embodiment functions as a 90-degree optical hybrid circuit.

Next, the manufacturing tolerance of the optical waveguide device according to the present embodiment will be described with reference to FIGS. 14 to 18.

To cancel the crosstalk of the quadrature phase signals, it is important to make the total of the phase shift amount in the optical phase shifter region ($\theta_1-\theta_2$) suitably $-\pi/4$ [rad]. When $\Delta\theta$ in the optical phase shifter shifts from the design value due to manufacturing process, the quadrature phase signal components alone are subjected to the characteristics degradation.

Usually, to make the optical signal processing without errors, it is necessary to suppress, on the receipt of optical signals, the parameter called the common-mode constant ratio (CMRR) to be not more than 20 dB. To obtain the CMRR of not more than 20 dB, it is desirable to suppress the I-channel and Q-channel imbalance within ~0.9 dB in the 90-degree optical hybrid circuit. However, in consideration of the fluctuations of the responsibility of the balanced optical receiver (balanced photodiode), the channel imbalance of the 90-degree optical hybrid circuit is severer.

FIGS. 14 and 15 are graphs illustrating the branching characteristics of the optical waveguide device given when the optical signal is incident from one of the input channels. FIG. 14 illustrates the branching characteristics of the optical waveguide according to the present embodiment illustrated in FIG. 11. FIG. 15 illustrates the branching characteristics of the optical waveguide device using the optical waveguides 26, 28 of the optical waveguide device of FIG. 9 as the optical phase shifter in place of the optical waveguides 22, 24 of FIG. 11. The optical waveguide device has the high-mesa waveguide structure illustrated in FIG. 4, and the energy band gap wavelength of the GaInAsP core layer is 1.05 µm. The offset $\Delta$ of the optical waveguides 22, 24, 26, 28 is optimized to be 0.04 µm.

As illustrated in FIGS. 14 and 15, it is seen that all the optical waveguides exhibit good branching characteristics, and both the I channel and the Q channel have small imbalances.

However, the effect of the manufacturing fluctuations on the channel imbalances conspicuously differs, depending on the waveguide structures in the optical phase shifter region.

FIGS. 16 and 17 are graphs illustrating the relationships between the offset $\Delta$ of the optical phase shifter region and the Q-channel imbalance. FIG. 16 illustrates the relationships of the optical waveguide device according to the present embodiment illustrated in FIG. 12. FIG. 17 illustrates the relationships of the optical waveguide using the optical waveguides 26, 28 of FIG. 9 as the optical phase shifter in place of the optical waveguides 22, 24 of FIG. 12.

As illustrated in FIG. 16, in the optical waveguide device according to the present embodiment, irrespective of optimizing the offset $\Delta$, the Q-channel imbalance is within ±0.3 dB. In the optical waveguide device according to the present embodiment, as described in the first embodiment, even when a mode fluctuation takes place in the optical phase shifter region, the influence can be suppressed, and the Q-channel imbalance can be always retained constant.

In the optical waveguide device using the optical waveguides 26, 28 of FIG. 9 as the optical phase shifter, however, as shown in FIG. 17, it is seen that as the offset $\Delta$ shifts from a design value (0.04 µm), the Q-channel imbalance becomes conspicuous.

The optical waveguide device according to the present embodiment can also prevent the characteristics degradation due to the variation amount $\delta W$ of the waveguide width.

FIG. 18 is a graph illustrating the relationships between the variation amount $\delta W$ of the waveguide width of the optical waveguide device according to the present embodiment and the Q-channel imbalance. In FIG. 18, the I-channel imbalance is omitted because the I-channel imbalance is not substantially influenced by the variation amount $\delta W$ of the waveguide width.

As illustrated in FIG. 18, in the optical waveguide device according to the present embodiment, even when the variation amount of the optical waveguide width varies in the range of $-0.05$ µm~$+0.05$ µm, the channel imbalance is within ±0.2 dB in the C band range. This means that the manufacturing tolerance is drastically improved.

The characteristics improving effect illustrated in FIGS. 16 to 18 is not limited to the optical waveguide device of the structure of FIG. 12. As exemplified in FIG. 19, for the two pairs of the output channels of the optical coupler 40, the same effect can be produced even with the ports connected to the optical phase shifter and the optical coupler 30 exchanged. In the structure of FIG. 19, the channels for outputting in-phase signal and quadrature phase signal are exchanged. In this case, the total of phase shift amounts in the optical phase shifter region ($\theta_1-\theta_2$), which is required for the phase matching between the optical coupler 40 and the optical coupler 30 is $+\pi/4$ [rad].

The total of the phase shift amounts ($\theta_1-\theta_2$) suitable for the optical waveguide devices of FIGS. 12 and 19 is not limited to $-\pi/4$ or $+\pi/4$. Basically, the same characteristics can be produced by setting the total ($\theta_1-\theta_2$) at $-\pi/4-(s\times\pi)/2$ (s is an arbitrary natural number) or $+\pi/4+(t\times n)/2$ (t is an arbitrary natural number).

The method of manufacturing the optical waveguide device according to the present embodiment is the same as the method of manufacturing the optical waveguide device according to the first embodiment except in the pattern configurations to be processed.

As described above, according to the present embodiment, the 90-degree optical hybrid circuit includes the optical waveguide device according to the first embodiment, and the 90-degree optical hybrid circuit can have high manufacturing tolerance. Thus, excessive losses and crosstalk of the quadrature phase components can be suppressed.

A Third Embodiment

An optical hybrid circuit according to a third embodiment will be described with reference to FIG. 20. The same members of the present embodiment as those of the optical waveguide device according to the first and the second embodiments are represented by the same reference numbers not to repeat or to simplify the description.

Figure 20:
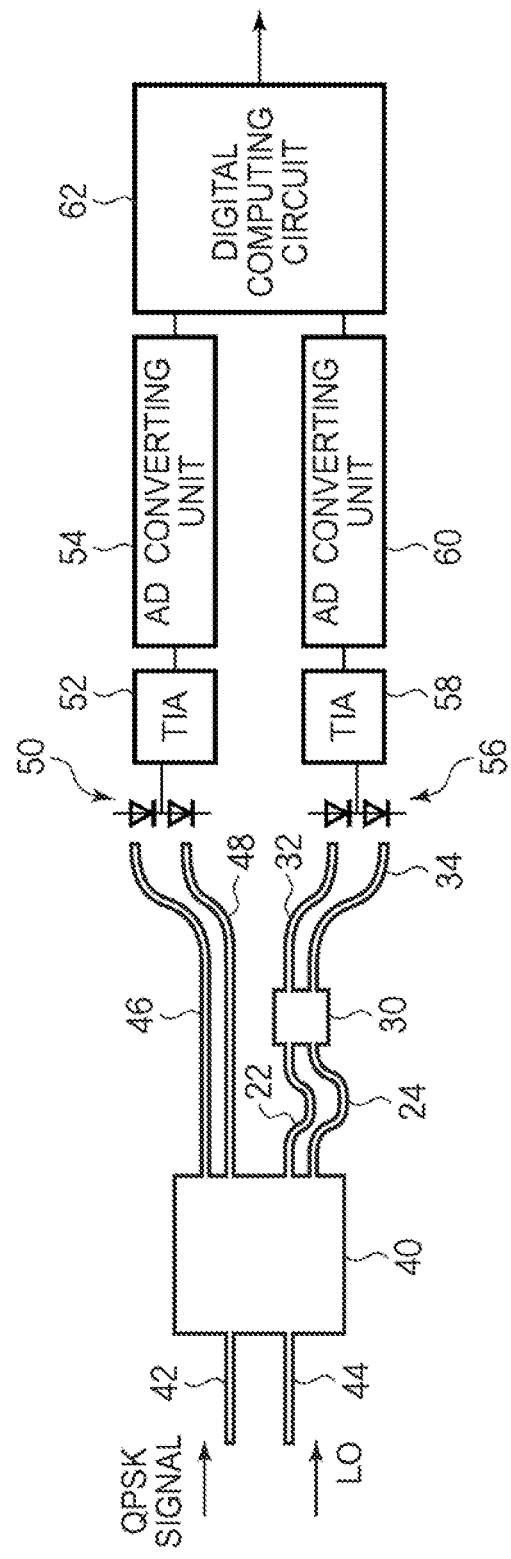
FIG. 20 is a plan view illustrating a structure of an optical hybrid circuit according to a third embodiment.

FIG. 20 is a plan view illustrating a structure of the optical hybrid circuit according to the present embodiment.

First, the structure of the optical hybrid circuit according to the present embodiment will be described with reference to FIG. 20. The optical hybrid circuit according to the present embodiment is the coherent optical receiver using the optical waveguide device according to the second embodiment.

That is, as illustrated in FIG. 20, a trans-impedance amplifier (TIA) 52 is connected to the outputs of the optical waveguides 46, 48 of the optical waveguide device according to the second embodiment via a balanced photodiode (BPD) 50. To the TIA 52, an AD converting unit 54 is connected. To the outputs of the optical waveguides 32, 34, a TIA 58 is connected via a BPD 56. To the TIA 58, an AD converting unit 60 is connected. To the AD converting unit 54 and the AD converting unit 60, a digital computing circuit 62 is connected.

Next, the operation of the optical hybrid circuit according to the present embodiment will be described with reference to FIG. 20.

A QPSK signal pulse, and an LO light synchronized in time with the QPSK signal pulse are incident on the optical waveguides 42, 44, which are the input ports of the 90-degree optical hybrid circuit. Signal light corresponding a phase of the QPSK signal light is outputted from the optical waveguides 32, 34, 46, 48, which are the output ports of the 90-degree optical hybrid circuit.

The signal lights outputted from the 90-degree optical hybrid circuit, which are of the in-phase channel and the quadrature phase channel, are respectively incident on the BPDs 50, 56, and are subjected to photoelectric conversion by the BPDs 50, 56.

The current signals outputted from the BPDs 50, 56 are converted to the voltage signals by the TIAs 52, 58.

The analog electric signals converted to the voltage signals are converted to the digital signals by the AD converters 54, 60 to be sent to the digital computing circuit 62.

The BPDs 50, 56 is characterized by flowing current corresponding to 1 or −1 for an input to the upper photodiode or the lower photodiode and flowing no current when inputs are made simultaneously to both photodiodes.

Thus, the digital signals sent to the digital computing circuit 62 are subjected to signal processing, whereby the phase information of the QPSK signal can be discriminated and can function as a coherent optical receiver.

As described above, according to the present embodiment, the coherent optical receiver includes the optical waveguide device according to the second embodiment, whereby the coherent optical receiver whose manufacturing tolerance is large can be realized.

A Fourth Embodiment

An optical waveguide device according to a fourth embodiment will be described with reference to FIG. 21. The same members of the present embodiment as those of the optical waveguide device according to the first to the third embodiments are represented by the same reference numbers not to repeat or to simplify the description.

Figure 21:
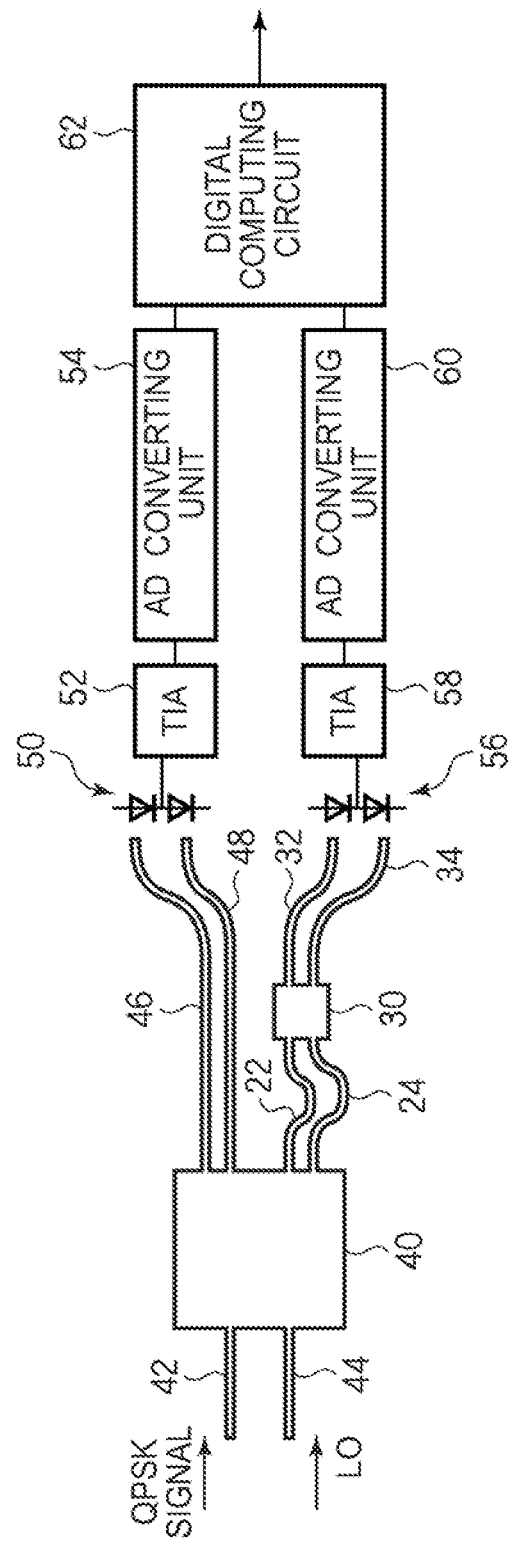
FIG. 21 is a plan view illustrating a structure of an optical waveguide device according to a fourth embodiment.

FIG. 21 is a plan view illustrating a structure of the optical waveguide device according to the present embodiment.

First, the structure of the optical waveguide device according to the present embodiment will be described with reference to FIG. 21. The optical waveguide device according to the present embodiment is a 90-degree optical hybrid circuit for differential quadrature phase shift keying (DQPSK) signal light.

As illustrated in FIG. 21, the optical waveguide device according to the present embodiment is basically the same as the optical waveguide device according to the second embodiment illustrated in FIG. 12 except that the structure upstream of the optical coupler 40 is different. Upstream of the optical coupler 40, an MMI-type optical coupler 70 having one input and two outputs are provided via optical waveguides 74, 76. The optical waveguides 74, 76 interconnecting the optical coupler 40 and the optical coupler 70 have optical path lengths different from each other. Input signal light is inputted to the input port of the optical coupler 70 via the optical waveguide 72. The optical waveguide device according to the present embodiment includes no LO light generating unit.

Next, the operation of the optical waveguide device according to the present embodiment will be described with reference to FIG. 21.

A DQPSK signal incident on the optical coupler via the optical waveguide 72 is branched into two paths of the optical waveguide 74 and the optical waveguide 76 by the optical coupler 70. An optical path length difference corresponding to a 1-bit delay of the DQPSK signal pulse is given between the optical waveguide 74 and the optical waveguide 76. Thus, the signal light branched into the two paths has one phase difference of 4 kinds of −90 degrees, +90 degrees, 0 degrees and 180 degrees.

The following operation of the optical coupler is the same as that of the optical waveguide device according to the second embodiment. Thus, the optical waveguide device according to the present embodiment functions as a 90-degree optical hybrid circuit.

The same 90-degree optical hybrid operation can be realized by using a Y branching coupler, a 2:2 MMI coupler or a 2:2 directional coupler in place of the optical coupler 70.

As described above, according to the present embodiment, a 90-degree optical hybrid circuit is formed by using the optical waveguide device according to the first embodiment, whereby the 90-degree optical hybrid circuit can have large manufacturing tolerance. Thus, excessive losses and crosstalk of the quadrature phase components can be suppressed. No LO light source is necessary, which simplifies the device constitution.

A Fifth Embodiment

An optical hybrid circuit according to a fifth embodiment will be described with reference to FIG. 22. The same members of the present embodiment as those of the optical waveguide device according to the first, the second and the fourth embodiments and the optical hybrid circuit according to the third embodiment are represented by the same reference numbers not to repeat or to simplify the description.

Figure 22:
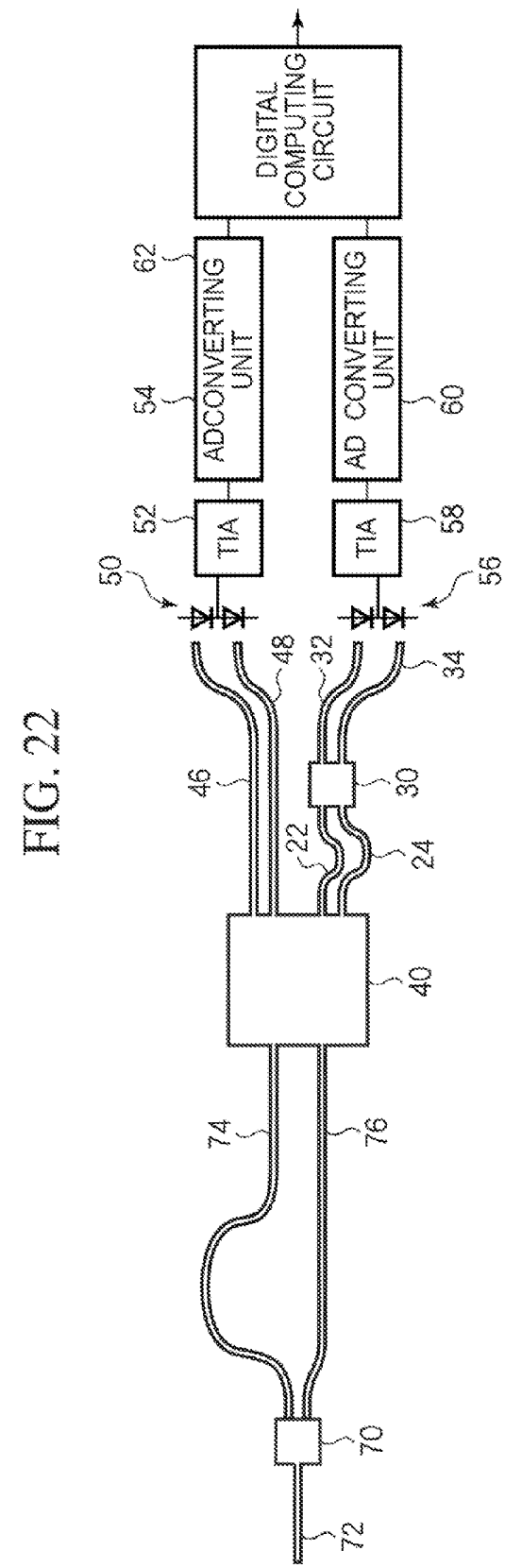
FIG. 22 is a plan view illustrating a structure of an optical hybrid circuit according to a fifth embodiment.

FIG. 22 is a plan view illustrating a structure of the optical hybrid circuit according to the present embodiment.

First, the structure of the optical hybrid circuit according to the present embodiment will be described with reference to FIG. 22.

The optical hybrid circuit according to the present embodiment is a coherent optical receiver using the optical waveguide device according to the fourth embodiment.

That is, as illustrated in FIG. 22, to the output sides of the optical waveguide device according to the fourth embodiment, a trans-impedance amplifier 52 is connected via the BPD 50. To the trans-impedance amplifier 52, an AD converting unit 54 is connected. To the output sides of the optical waveguides 32, 34, a trans-impedance amplifier 58 is connected via the BPD 56. To the trans-impedance amplifier 58, an AD converting unit 60 is connected. To the AD converting unit 54 and the AD converting unit 60, the digital computing circuit 62 is connected.

Next, the operation of the optical hybrid circuit according to the present embodiment will be described with reference to FIG. 20.

A DQPSK signal incident on the optical coupler 70 via the optical waveguide 72 is branched into the two paths of the optical waveguides 74 and the optical waveguides 76 by the optical coupler 70. The optical waveguide 74 and the optical waveguide 76 have an optical path length difference corresponding to a 1-bit delay of the DQPSK signal. The signal light branched into the two paths has output modes which are differed by a relative phase difference between the signal light of the two paths as described in the fourth embodiment.

The output light from the optical waveguides 74, is incident on the optical waveguides 42, 44, which are the input ports of the 90-degree optical hybrid circuit. Thus, from the optical waveguides 32, 34, 46, 48, which are the output ports of the 90-degree optical hybrid circuit, signal light corresponding to a phase of the DQPSK signal light is outputted.

The signal lights outputted from the 90-degree optical hybrid circuit, which are of the in-phase channel and the quadrature phase channel, are respectively incident on the BPDs 50, 56, and are subjected to photoelectric conversion by the BPDs 50, 56.

The current signals outputted from the BPDs 50, are converted to voltage signals by the trans-impedance amplifiers 52, 58.

The analog electric signals converted to the voltage signals are converted to digital signals by the AD converting units 54, 60 and are sent to the digital computing circuit 62.

Here, the BPDs 50, 56 is characterized by flowing current corresponding to 1 or −1 for an input to the upper photodiode or the lower photodiode and flowing no current when inputs are made simultaneously to both photodiodes.

Thus, the digital signals sent to the digital computing circuit 62 are subjected to signal processing, whereby the phase information of the DQPSK signal can be discriminated, and the optical hybrid circuit can function as a coherent optical receiver.

As described above, according to the present embodiment, the coherent optical receiver includes the optical waveguide device according to the fourth embodiment, whereby the coherent optical receiver can have a large manufacturing tolerance. No LO light source is unnecessary, which can simplify the device constitution.

Modified Embodiments

The above-described embodiment can cover other various modifications.

For example, the structures, the constituent materials, the manufacturing conditions etc. of the optical waveguide device described in the above-described embodiments are just one example and can be changed or modified suitably in accordance with the technical common sense, etc. of those skilled in the art.

For example, in the above-described embodiments, the optical waveguide device is formed of InP-based compound semiconductor materials, but the materials forming the optical waveguide device are not limited to them. By forming the optical waveguide device, e.g., of GaAs-based compound semiconductor materials, Si-based semiconductor materials, dielectric materials, polymer materials, etc., the same effects as those produced by the optical waveguide device according to the above-described embodiments can be produced.

In the above-described embodiments, the optical waveguide devices has the high-mesa waveguide structure, but the structure of the waveguide is not limited to the high-mesa waveguide structure. For example, the optical waveguide device can have other structures, such as the Buried Hetero (BH) structure, the ridge waveguide structure, etc.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An optical waveguide device comprising:
a first optical coupler branching an input light to output a first signal light and a second signal light;
an optical phase shifter for giving a phase difference between the first signal light and the second signal light including:
a first optical waveguide connected to the first optical coupler and propagating the first signal light; and
a second optical waveguide having an optical path length different from that of an optical path length of the first optical waveguide, connected to the first optical coupler and propagating the second signal light; and
a second optical coupler for coupling the first signal light outputted from the first optical waveguide and the second signal light outputted from the second optical waveguide connected to the first optical waveguide and the second optical waveguide of the optical phase shifter, wherein
the first optical waveguide has a first waveguide width and is a bent optical waveguide bent in a first direction at a first radius of curvature,
the second optical waveguide has a second waveguide width and is a bent optical waveguide bent in a second direction at a second radius of curvature,
the first waveguide width and the second waveguide width are equal to each other,
the first direction and the second direction are the same, and
the first radius of curvature and the second radius of curvature are the same, wherein
a bend angle of the first optical waveguide and a bend angle of the second optical waveguide are different from each other.

2. The optical waveguide device according to claim 1, wherein
the first optical waveguide has a first linear waveguide between the first optical coupler and the bent portion, and a second linear waveguide between the bent portion and the second optical coupler, and
the second optical waveguide has a third linear waveguide between the first optical coupler and the bent portion, and a fourth linear waveguide between the bent portion and the second optical coupler.

3. The optical waveguide device according to claim 2, wherein
offsets are provided between the bent portion of the first optical waveguide and the first linear waveguide, between the bent portion of the first optical waveguide and the second linear waveguide, between the bent portion of the second optical waveguide and the third linear waveguide, and between the bent portion of the second optical waveguide and the fourth linear waveguide.

4. The optical waveguide device according to claim 1, wherein
the first optical coupler, the second optical coupler, the first optical waveguide and the second optical waveguide has a high-mesa waveguide structure.

5. The optical waveguide device according to claim 1, wherein
the first optical coupler has two input ports and four output ports forming two pairs of output channels, and
the first optical waveguide and the second optical waveguide are connected to one of the two pairs of output channels.

6. The optical waveguide device according to claim 5, wherein
the second optical coupler is an optical coupler having two input ports and two output ports.

7. The optical waveguide device according to claim 5, wherein
a quadrature phase shift keying signal is inputted into one of the two input ports of the first optical coupler, and
a local oscillator light is inputted to the other of the two input ports of the first optical coupler.

8. The optical waveguide device according to claim 5, further comprising:
a third optical coupler having one input port and two output ports;
a third waveguide interconnecting one of the two output ports of the third optical coupler and one of the two input ports of the first optical coupler; and
a fourth optical waveguide which is different from the third optical waveguide in an optical path length and interconnecting the other of the two output ports of the third optical coupler and the other of the two input ports of the first optical coupler.

9. The optical waveguide device according to claim 8, wherein
differential quadrature phase shift keying signal light is inputted into the one input port of the third optical coupler.

10. The optical waveguide device according to claim 1, wherein
the second optical coupler is an optical coupler having two input ports and two output ports.

11. The optical waveguide device according to claim 10, wherein
a quadrature phase shift keying signal is inputted into one of the two input ports of the first optical coupler, and
a local oscillator light is inputted to the other of the two input ports of the first optical coupler.

12. The optical waveguide device according to claim 10, further comprising:
a third optical coupler having one input port and two output ports;
a third waveguide interconnecting one of the two output ports of the third optical coupler and one of the two input ports of the first optical coupler; and
a fourth optical waveguide which is different from the third optical waveguide in an optical path length and interconnecting the other of the two output ports of the third optical coupler and the other of the two input ports of the first optical coupler.

13. The optical waveguide device according to claim 12, wherein
differential quadrature phase shift keying signal light is inputted into the one input port of the third optical coupler.

14. An optical hybrid circuit comprising:
an optical waveguide device including:
a first optical coupler branching an input light to output a first signal light and a second signal light;
an optical phase shifter for giving a phase difference between the first signal light and the second signal light including:
a first optical waveguide connected to the first optical coupler and propagating the first signal light; and
a second optical waveguide having an optical path length different from that of an optical path length of the first optical waveguide, connected to the first optical coupler and propagating the second signal light; and
a second optical coupler for coupling the first signal light outputted from the first optical waveguide and the second signal light outputted from the second optical waveguide connected to the first optical waveguide and the second optical waveguide of the optical phase shifter, wherein
the first optical waveguide has a first waveguide width and is a bent optical waveguide bent in a first direction at a first radius of curvature,
the second optical waveguide has a second waveguide width and is a bent optical waveguide bent in a second direction at a second radius of curvature,
the first waveguide width and the second waveguide width are equal to each other,
the first direction and the second direction are the same,
the first radius of curvature and the second radius of curvature are the same,
the first optical coupler has two input ports and four output ports forming two pairs of output channels, and
the first optical waveguide and the second optical waveguide are connected to one of the two pairs of output channels;
a photoelectric converting unit converting to electric signals an optical signal outputted from the other pair of output ports of the first optical coupler and an optical signal outputted from the output port of the second optical coupler; and
a computing unit executing a processing of discriminating the input light, based on the electric signals, wherein
a bend angle of the first optical waveguide and a bend angle of the second optical waveguide are different from each other.

15. The optical hybrid circuit according to claim 14, wherein
the second optical coupler is an optical coupler having two input ports and two output ports.

16. The optical hybrid circuit according to claim 15, further comprising:
a third optical coupler having one input port and two output ports;
a third waveguide interconnecting one of the two output ports of the third optical coupler and one of the two input ports of the first optical coupler; and
a fourth optical waveguide which is different from the third optical waveguide in an optical path length and interconnecting the other of the two output ports of the third optical coupler and the other of the two input ports of the first optical coupler.

17. An optical hybrid circuit comprising:
an optical waveguide device including:
a first optical coupler branching an input light to output a first signal light and a second signal light;
an optical phase shifter for giving a phase difference between the first signal light and the second signal light including:
a first optical waveguide connected to the first optical coupler and propagating the first signal light; and a second optical waveguide having an optical path length different from that of an optical path length of the first optical waveguide, connected to the first optical coupler and propagating the second signal light; and a second optical coupler for coupling the first signal light outputted from the first optical waveguide and the second signal light outputted from the second optical waveguide connected to the first optical waveguide and the second optical waveguide of the optical phase shifter, wherein the first optical waveguide has a first waveguide width and is a bent optical waveguide bent in a first direction at a first radius of curvature, the second optical waveguide has a second waveguide width and is a bent optical waveguide bent in a second direction at a second radius of curvature, the first waveguide width and the second waveguide width are equal to each other, the first direction and the second direction are the same, the first radius of curvature and the second radius of curvature are the same, and the second optical coupler is an optical coupler having two input ports and two output ports;

a photoelectric converting unit converting to electric signals an optical signal outputted from the other pair of output ports of the first optical coupler and an optical signal outputted from the output port of the second optical coupler; and a computing unit executing a processing of discriminating the input light, based on the electric signals, wherein a bend angle of the first optical waveguide and a bend angle of the second optical waveguide are different from each other.

18. The optical hybrid circuit according to claim 17, further comprising:

a third optical coupler having one input port and two output ports;

a third waveguide interconnecting one of the two output ports of the third optical coupler and one of the two input ports of the first optical coupler; and a fourth optical waveguide which is different from the third optical waveguide in an optical path length and interconnecting the other of the two output ports of the third optical coupler and the other of the two input ports of the first optical coupler.

* * * * *